Patented Jan. 2, 1934

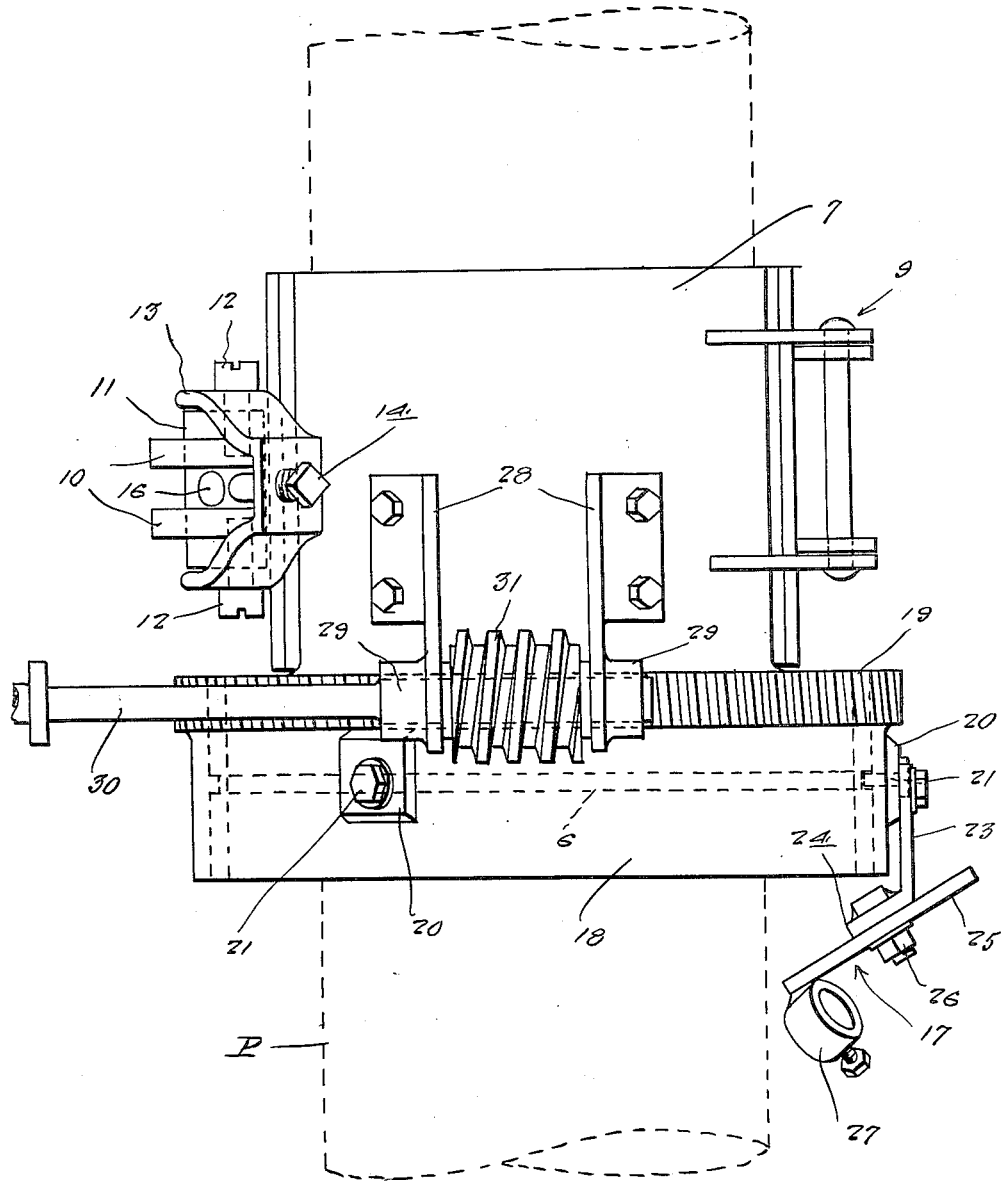

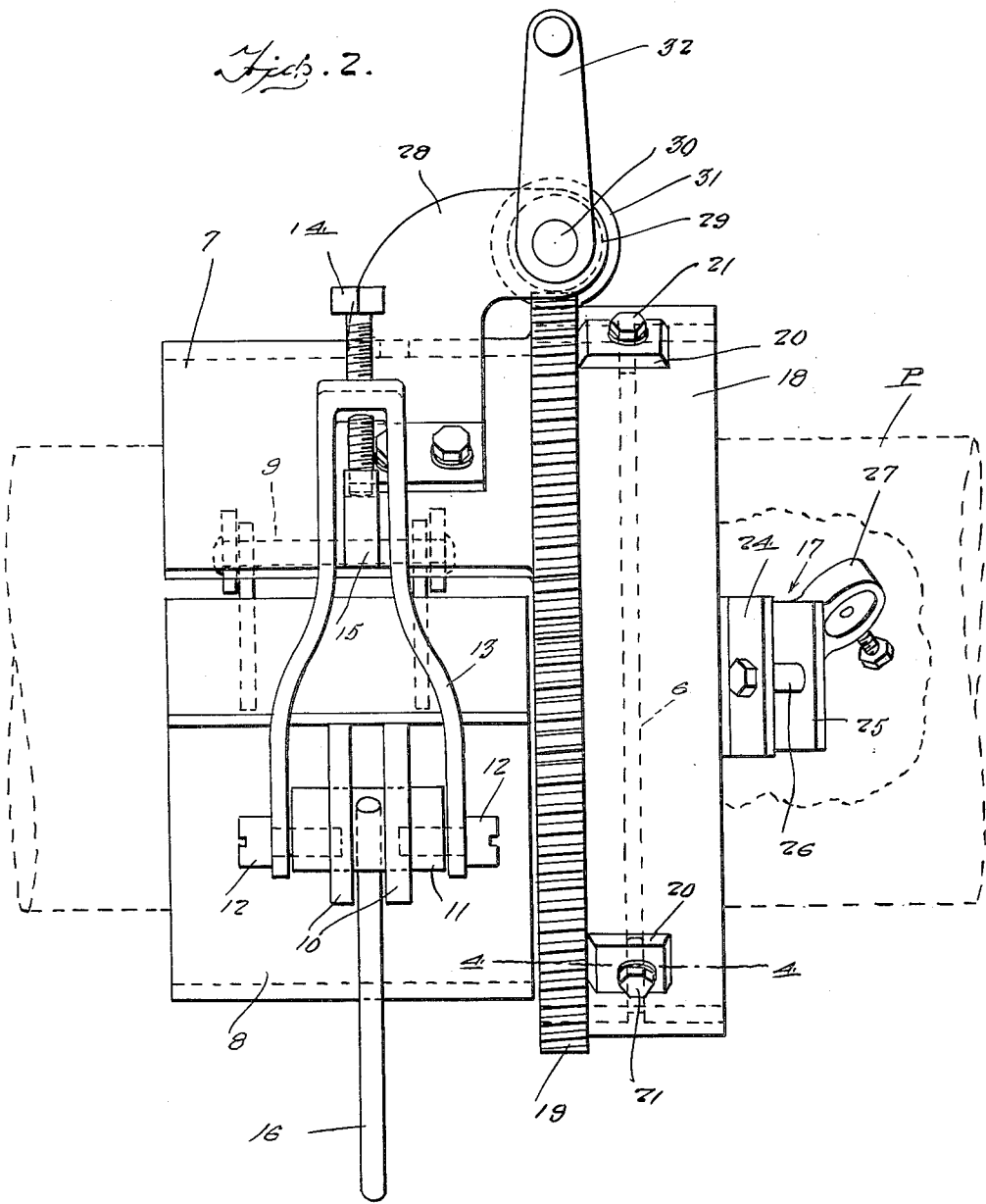

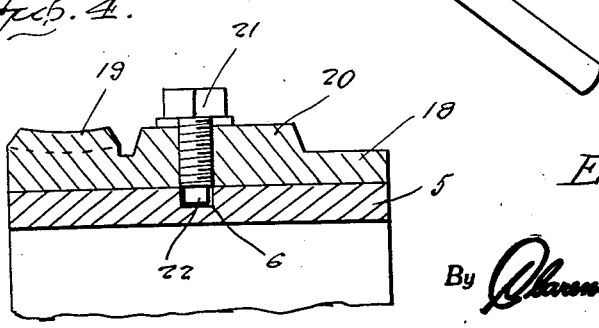

1,942,099

UNITED STATES PATENT OFFICE 1,942,099

PIPE CUTTING AND BEVELING APPARATUS

Elonza L. Hart, Charleston, W. Va.

Application February 23, 1933. Serial No. 658,261

3 Claims. (Cl. 266—23)

This invention relates to a novel device or apparatus constructed to function as a mounting and carrier for a pipe cutting and beveling instrument such as a blow pipe.

More specifically stated, the invention embraces a quick acting and dependable clamp designed to embrace the pipe, together with a duplex ring assembly formed integral with a part of the clamp and equipped with attaching and retaining means serving as a torch and blowpipe holder.

Carrying further the brief idea embodied in the foregoing paragraph it will be observed that the preferred embodiment of the invention is such that the torch holder is movable in an orbital path around the pipe to permit the flame of the blowpipe to impinge against the pipe so that it may perform to accurately cut and bevel the pipe, leaving the pipe ends perfectly smooth and the bore of the pipe free from burrs, slag, scale and with a perfect feather edge ready for welding purposes.

In carrying the principles of the inventive conception into actual practice I have evolved and produced a practicable structure wherein the parts are scientifically exact, carefully selected, appropriately balanced and otherwise structurally coordinated to attain the requisite stability and smoothness of action necessary in perfecting what is believed to be an achievement, in this particular line of endeavor.

Other features and advantages relied upon as a foundation for the foregoing assertion will become more readily apparent from the following description and the accompanying illustrative drawings.

In the accompanying drawings wherein like numerals are employed to designate like parts throughout the same:—

Figure 1 is a top plan view of the complete assembly illustrating the applied position with respect to the pipe and omitting the torch and blow pipe for clearness.

Figure 2 is a side elevational view of the structure illustrated in Figure 1.

Figure 3 is an end elevation observing the structure in Figure 2 in a direction from right to left.

Figure 4 is an enlarged cross section taken approximately on the plane of the line 4—4 of Figure 2.

Referring now to the drawings by distinguishing reference characters it will be observed that the pipe is generally distinguished by the letter P. Surrounding the pipe in concentric relationship is an annulus or ring which may be distinguished by the numeral 5 and designated as a relatively stationary mounting. As shown in Figure 4, this is formed with a circumferentially extending groove 6 which functions as a track or guideway. This ring is held in place on the pipe through the instrumentality of a two-part clamp, the primary part (see Figure 3) being denoted by the numeral 7 and formed integral with the ring 5. That portion of the part 7 gripping the pipe is of general V-shaped form. The relatively movable companion part of the clamp is distinguished by the numeral 8 and is of duplicate configuration. It is hingedly connected with the part 7 as indicated at 9 in Figure 1, thus allowing it to swing toward and from the pipe as required for placement and removal. Referring to Figure 2 it will be noticed that the free swingable end portion of the part 8 is provided with a pair of spaced parallel outstanding apertured ears 10 in which an eccentric 11 is mounted for oscillation. The eccentric carries trunnion bolts 12 with which the arm portions of a yoke 13 swingably connect. The bight portion of the yoke is provided with an adjusting screw 14 engageable with a retention lug 15 on the free end of the part 7. The numeral 16 designates a handle or lever connected to the eccentric in a manner to render the yoke 13 effective. It will thus be observed that the clamping means comprises a pair of substantially duplicate V-shaped diametrically opposed companion parts 7 and 8 hingedly connected together at one end and provided at their opposite ends with adjustable fastening and retaining means. The latter means is quick and effective and sensitively adjustable. By swinging the bight portion of the yoke up over the retention lug 15 and making the proper adjustment of the set screw 14 it is evident that the final take up and binding action is produced by rotating the eccentric 11 in the bearing holes of the supporting ears 10. This adjustment is quickly effected by the conveniently operable lever 16.

I next call attention to the tool holder 17 (see Figure 1) and its carrier and revolving ring 18. The ring 18 surrounds the first named ring 5 and is provided around one marginal edge portion with a ring gear 19. At circumferentially spaced points the ring 18 is equipped with bosses 20 having threaded holes to accommodate bolts 21. The inner ends of the bolts are reduced and of smooth construction as indicated at 22 in Figure 4 and function as guide elements extending into the guideway 6. These bolts 21 serve several purposes. In the first place they constitute the means for holding the ring 18 in assembled position on the ring 5. Secondly they serve as guide means in that they co-operate with the guide groove 6 allowing the ring 18 to revolve or rotate around the relatively stationary ring 5. The bolts permit quick application and removal of the ring 18 for repair and other purposes. Moreover these bolts together with the threaded holes through which they extend provide oil ports, whereby upon removing the bolts one at a time the guideway 6 may be lubricated to facilitate smooth operation of the ring 18.

One of these bolts, as shown in Figure 1, has the additional function of a retaining element for the tool holder 17. The tool holder as shown in the last named figures comprises an attaching bracket 23 to whose laterally directed free end 24 a complemental plate 25 is adjustably attached by way of a fastener 26. The plate 25 is equipped with an appropriately angled collar or socket 27 to accommodate the blowpipe (not shown).

Attention is now invited to a pair of hanger fixtures 28 bolted or otherwise fastened to the part 7 of the aforesaid clamp. These fixtures are provided with alined bearings 29 to accommodate a rotary drive shaft 30 carrying a worm 31 whose threads mesh with the teeth of the aforementioned ring gear 19. The shaft 30 is rotated by way of a simple hand crank 32.

It is obvious that when the tool is fastened to the holder 17 and the hand crank 32 rotated, the tool holder revolves with the rotary ring 18 under the influence of the coacting worm 31 and associated ring gear 19. This arrangement allows the flame to be played on the pipe and moved therearound at the requisite speed for cutting, beveling and otherwise finishing the end with a perfect feather edge ready for welding purposes.

Novelty is predicated on the expeditiously usable firmly retained clamp and its special fastening means in conjunction with the rotary tool carrier and operating means therefor. Equal emphasis and stress is placed on the relatively stationary mounting or inner ring 5 and the complementary rotary travelling ring 18. Particular attention is called to the adjustable tool holding means 17 and the method of attaching it to the ring 18 by way of the multiple acting bolts 21. Then too, the simplified adaptation of the brackets 28 and associated gearing for driving the ring 18 constitutes an added feature in the general assembly.

A careful consideration of the foregoing description in conjunction with the illustrative drawings will enable the reader to obtain a clear understanding of the purpose, features and advantages, the explicit construction, and the invention as hereinafter claimed.

It is to be understood that minor changes in shape, size, relative proportions, and materials may be resorted to in practice without departing from the spirit of the invention or the scope of the invention as now claimed.

Having thus described my invention, what I claim as new is:

1. In a structure of the class described, a pipe clamp comprising a pair of substantially duplicate V-shaped companion members adapted to embrace the pipe, said members being hingedly connected together at one end, the relatively movable member being provided at its free end with apertured spaced parallel lugs, an eccentric mounted in the apertures of said lugs, a retention lug carried by the corresponding end of the remaining member, a swingable yoke swingably connected with the eccentric and swingable over the retention lug, a set screw carried by the yoke and engageable with said last named lug, an operating lever connected with said eccentric, a relatively stationary supporting ring carried by one of the members of the clamp, together with tool carrying and operating means mounted for rotation on said ring.

2. In a device of the class described, a pair of jaw members hingedly connected together, means for holding the jaw members clamped upon an object, a ring co-axial with the clamped jaw members having a portion of one edge connected to an edge of one of the jaw members with the ring extending outwardly from said jaw member and said ring being free of the other jaw member, whereby said jaw members can be opened and closed without interference from the ring, a second ring rotatably arranged on the first ring and a tool holder carried by the second ring.

3. In a device of the class described, a pair of jaw members hingedly connected together, means for holding the jaw members clamped upon an object, a ring co-axial with the clamped jaw members having a portion of one edge connected to an edge of one of the jaw members with the ring extending outwardly from said jaw member, a second ring rotatably arranged on the first ring, the first ring having an annular groove therein, an annular row of spaced enlargements on the outer face of the second ring, bolts passing through said enlargements and the second ring and having their inner ends reduced and unthreaded and fitting in the annular grooves of the first ring to detachably and rotatably support the second ring on the first ring, means for rotating the second ring on the first ring, such means including a support attached to that jaw to which the first ring is connected, a shaft carried by the support and having a worm thereon, a ring gear on the second ring and engaged by the worm and a tool holder carried by the second ring.

ELONZA L. HART.